United States Patent
Lim et al.

(10) Patent No.: US 10,493,976 B2
(45) Date of Patent: Dec. 3, 2019

(54) RECHARGE SYSTEMS AND METHODS

(71) Applicants: Hyundai Motor Company, Seoul (KR); Research & Business Foundation Sungkyunkwan University, Suwon, Gyeonggi-do (KR); Kia Motors Corporation, Seoul (KR)

(72) Inventors: Seong Yeop Lim, Seoul (KR); Gu Bae Kang, Yongin (KR); Jeongbin Yim, Incheon (KR); Byungsoon Min, Gyeonggi-Do (KR); Byoung-Kuk Lee, Gyeonggi-Do (KR); Seung-Min Shin, Gyeonggi-Do (KR); Dong-Hee Kim, Busan (KR); Dong-Gyun Woo, Gyeonggi-Do (KR)

(73) Assignees: Hyndai Motor Company, Seoul (KR); Research & Business Foundation Sungkyunkwan University, Suwon, Gyeonggi-do (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 15/669,374

(22) Filed: Aug. 4, 2017

(65) Prior Publication Data
US 2017/0327103 A1    Nov. 16, 2017

Related U.S. Application Data

(62) Division of application No. 14/686,505, filed on Apr. 14, 2015, now Pat. No. 9,725,001, which is a division (Continued)

(30) Foreign Application Priority Data

Dec. 9, 2011 (KR) .................. 10-2011-0132254

(51) Int. Cl.
*B60W 10/26* (2006.01)
*B60L 15/00* (2006.01)
(Continued)

(52) U.S. Cl.
CPC .......... *B60W 10/26* (2013.01); *B60L 15/007* (2013.01); *B60L 50/16* (2019.02); *B60L 50/61* (2019.02);
(Continued)

(58) Field of Classification Search
CPC .. B60L 11/1809; B60L 11/1814; B60L 53/60; B60L 53/61; B60L 50/16;
(Continued)

(56) References Cited

U.S. PATENT DOCUMENTS 7,352,143 B2   4/2008 Inaba et al.
7,821,214 B2 * 10/2010 Yaguchi ................ B60K 6/445
                                                       318/400.09
(Continued)

FOREIGN PATENT DOCUMENTS

CN    101253666 A    8/2008
JP    10136570 A     5/1998
(Continued)

*Primary Examiner* — Stacy Whitmore
(74) *Attorney, Agent, or Firm* — Mintz Levin Cohn Ferris Glovsky and Popeo, P.C.; Peter F. Corless

(57) ABSTRACT

A charging device according to an exemplary embodiment of the present invention may include: a battery adapted and configured to store a DC voltage, first and second motors adapted and configured to operate as a motor or a generator, first and second inverters adapted and configured to operate the first and second motors, a voltage transformer adapted and configured to boost the DC voltage of the battery to supply it to the first and second inverters and boosts the DC voltage of the inverter to supply it to the battery, and a charging controller adapted and configured to operate the
(Continued)

first and second inverters as a booster or operate the voltage transformer as a buck booster according to a voltage that is input through a neutral point of the first and second motors and the voltage of the battery.

23 Claims, 6 Drawing Sheets

Related U.S. Application Data of application No. 13/558,812, filed on Jul. 26, 2012, now abandoned.

(51) Int. Cl.
| | | |
|---|---|---|
| H02J 7/00 | (2006.01) | |
| B60W 20/13 | (2016.01) | |
| B60L 50/16 | (2019.01) | |
| B60L 53/24 | (2019.01) | |
| B60L 53/30 | (2019.01) | |
| B60L 53/60 | (2019.01) | |
| B60L 53/00 | (2019.01) | |
| B60L 53/22 | (2019.01) | |
| H02J 7/02 | (2016.01) | |
| B60W 20/10 | (2016.01) | |
| H02M 7/68 | (2006.01) | |
| B60L 50/61 | (2019.01) | |
| H02J 7/14 | (2006.01) | |

(52) U.S. Cl.
CPC ............. *B60L 53/24* (2019.02); *B60L 53/30* (2019.02); *B60L 53/60* (2019.02); *B60W 20/10* (2013.01); *B60W 20/13* (2016.01); *H02J 7/007* (2013.01); *H02J 7/022* (2013.01); *H02M 7/68* (2013.01); *B60L 53/00* (2019.02); *B60L 53/22* (2019.02); *B60L 2210/40* (2013.01); *H02J 7/1446* (2013.01); *Y02T 10/6217* (2013.01); *Y02T 10/645* (2013.01); *Y02T 10/646* (2013.01); *Y02T 10/7005* (2013.01); *Y02T 10/7077* (2013.01); *Y02T 10/7241* (2013.01)

(58) Field of Classification Search
CPC ........ B60L 53/24; B60L 53/30; B60L 15/007; B60L 10/26; B60L 20/10; B60L 50/24; B60L 53/22; H02J 7/1446; H02J 7/007; H02J 7/022; B60W 20/13; H02M 7/68
USPC .................................................. 320/104, 162
See application file for complete search history.

(56) References Cited

U.S. PATENT DOCUMENTS

| | | | |
|---|---|---|---|
| 8,053,915 B2* | 11/2011 | Umeda | H02P 9/48 290/7 |
| 9,725,001 B2* | 8/2017 | Lim | H02J 7/022 |
| 2007/0171689 A1 | 7/2007 | Ishikawa et al. | |
| 2008/0303529 A1 | 12/2008 | Nakamura et al. | |
| 2009/0034300 A1 | 2/2009 | Ito et al. | |
| 2009/0115375 A1 | 5/2009 | Iida | |
| 2009/0121659 A1 | 5/2009 | Oyobe et al. | |
| 2009/0146613 A1* | 6/2009 | Yang | H02J 7/0014 320/139 |
| 2009/0306841 A1 | 12/2009 | Miwa et al. | |
| 2009/0315518 A1 | 12/2009 | Soma et al. | |
| 2010/0006359 A1 | 1/2010 | Ang et al. | |
| 2010/0019374 A1* | 1/2010 | Hundt | H01L 23/36 257/693 |
| 2010/0072865 A1 | 3/2010 | Endo et al. | |
| 2010/0274420 A1 | 10/2010 | Veit et al. | |
| 2010/0318250 A1 | 12/2010 | Mitsutani | |

FOREIGN PATENT DOCUMENTS

| | | |
|---|---|---|
| JP | 2007-068340 A | 3/2007 |
| JP | 2007-068362 A | 3/2007 |
| JP | 2007-097342 A | 4/2007 |
| JP | 2007-318970 A | 12/2007 |
| JP | 2009-060759 A | 3/2009 |
| JP | 2009-065728 A | 3/2009 |
| JP | 2010-098851 A | 4/2010 |
| JP | 2011-072069 A | 4/2011 |
| KR | 2009-0097030 A | 9/2009 |
| WO | 2009/034872 A1 | 3/2009 |

\* cited by examiner

RECHARGE SYSTEMS AND METHODS

CROSS-REFERENCE TO RELATED APPLICATION

This Application is a Division of application Ser. No. 14/686,505 filed on Apr. 14, 2015. Application Ser. No. 14/686,505 is a Division of application Ser. No. 13/558,812 filed on Jul. 26, 2012. Application Ser. No. 13/558,812 claims priority for Application 10-2011-0132254 filed on Dec. 9, 2011 in the Republic of Korea. The entire contents of these applications are incorporated herein by reference in their entirety.

FIELD OF THE INVENTION

The present invention relates to charging devices and methods. More particularly, the present invention relates to charging devices and methods for an environmentally-friendly vehicle that uses an outside commercial power source that it is plugged into through a power net that is formed in an environmentally-friendly vehicle to charge a battery, and a method thereof.

BACKGROUND OF THE INVENTION

An environmentally-friendly vehicle including an electric vehicle, which is a plug-in electric vehicle that offers enhancement of fuel consumption and exhaust gas stabilization, includes a high voltage/high current power net.

The environmentally-friendly vehicle uses a plug-in method that uses outside commercial electric power to charge a battery.

An on-board charger is provided in the environmentally-friendly vehicle that rectifies outside commercial electric power to offer slow charging through plug-in charging.

The on-board charger that is disposed in the environmentally-friendly vehicle includes a high voltage switch, an inductor, a capacitor, an insulation-type transformer, and a cooling system, and packaging for them is necessary.

Also, each component for the on-board charger is expensive and heavy. which causes an overall increased cost and decreased fuel efficiency.

Particularly, the price of the charger is similar to that of the operating inverter having about ten times the capacity to raise the cost of the environmentally-friendly vehicle, and this weakens the cost competitiveness thereof.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a charging device of an environmentally-friendly vehicle having advantages of using commercial electric power that is supplied through a plug-in and using a power net inside a vehicle without a separate charger in an environmentally-friendly vehicle.

Also, the present invention has advantages of minimizing a switching loss of a voltage transformer and an inverter by operating the voltage transformer or the inverter according to a condition of the input voltage and the battery voltage.

Also, the present invention has advantages of offering charging efficiency by adding power factor correction (PFC) in boosting control of the inverter and the voltage transformer.

A charging device according to an exemplary embodiment of the present invention can include: a battery adapted and configured to store a DC voltage, first and second motors that are operated as a motor or a generator, first and second inverters adapted and configured to operate the first and second motors, a voltage transformer adapted and configured to boost the DC voltage of the battery to supply it to the first and second inverters and boost the DC voltage of the inverter to supply it to the battery, and a charging controller adapted and configured to operate the first and second inverters as a booster or operate the voltage transformer as a buck booster according to a voltage that is input through a neutral point of the first and second motors and the voltage of the battery.

The charging controller controls the first and second inverters to be turned off and controls the voltage transformer to be a buck booster, if the voltage that is input through the neutral point of the first and second motors exceeds a battery voltage.

The charging controller bypasses the voltage that is input through the neutral point of the first and second motors to the voltage transformer while the first and second inverters are turned off.

The charging controller switches the first and second inverters according to the input voltage of the neutral point such that the first and second inverters are boosters and continuously turns on an upper switching element of the voltage transformer, if the battery voltage exceeds the voltage that is input through the neutral point of the first and second motors.

The charging controller controls such that the voltage transformer boosts voltage and performs DC voltage transformation to charge the battery, if the input voltage of the neutral point of the first and second motors exceeds a battery voltage.

The charging controller only uses the first and second inverters to perform voltage boosting and DC voltage transformation such that the boosted and DC transformed voltage is supplied to the battery as a charging voltage, if the input voltage that is input through the neutral point of the first and second motors is less than the battery voltage.

The charging controller cuts off the voltage that is input to the neutral point of the first and second motors, if it is determined that the battery is fully charged.

The charging controller operates the first inverter as a booster, if the battery voltage exceeds the input voltage of the neutral point of the first and second motors and the phase of the input voltage has a positive value ($V_{in}>0$).

The charging controller operates the second inverter as a booster, if the battery voltage exceeds the input voltage of the neutral point of the first and second motors and the phase of the input voltage has a negative value ($V_{in}<0$).

A charging method according to an exemplary embodiment of the present invention can include detecting a connection of a charging plug, detecting a voltage that is input through a neutral point of first and second motors and a voltage of a battery, if the connection of the charging plug is detected, and charging a battery by operating first and second inverters as a boosters or operating a voltage transformer as a buck booster depending on a relation between a voltage input through the neutral point of the first and second motors and a battery voltage.

The input voltage may be boosted only by the voltage transformer to charge the battery, if the voltage input through the neutral point of the first and second motors exceeds the battery voltage.

The input voltage may be boosted only by the first and second inverters to charge the battery, if the voltage input through the neutral point of the first and second motors is less than the battery voltage.

The first and second inverters may maintain a turned-off condition and the voltage input through the neutral point of the first and second motors is bypassed to the voltage transformer, if the voltage input through the neutral point of the first and second motors exceeds the battery voltage.

The first and second inverters may be switched depending on the phase of the input voltage such that the first and second inverters are operated as boosters and an upper switching element of the voltage transformer is controlled to be continuously turned on, if the voltage input through the neutral point of the first and second motors is less than the battery voltage.

In a condition that the voltage input through the neutral point of the first and second motors is less than the battery voltage, if the phase of the input voltage is a positive value ($V_{in}>0$), the first inverter may be operated as a booster, and if the phase of the input voltage is a negative value ($V_{in}<0$), the second inverter may be operated as a booster.

A charging method according to an exemplary embodiment of the present invention may include detecting a connection of a charging plug, detecting a voltage that is input through a neutral point of first and second motors and a voltage of a battery, if the connection of the charging plug is detected, charging a battery by boosting the input voltage through a voltage transformer, if the voltage input through the neutral point of the first and second motors exceeds the battery voltage, and charging a battery by boosting the input voltage through first and second inverters depending on the input voltage, if the voltage input through the neutral point of the first and second motors is less than the battery voltage.

The first and second inverters may be maintained in a turned-off condition such that the switching loss does not occur while the input voltage is boosted by the voltage transformer.

When the first and second inverters boost the input voltage, an upper switching element of the voltage transformer may be controlled to be continuously turned on such that a switching loss of the voltage transformer does not occur.

When the voltage input through the neutral point of the first and second motors is less than the battery voltage, if the phase of the input voltage is a positive value ($V_{in}>0$), the first inverter may be controlled to boost the input voltage, and if the phase of the input voltage is a negative value ($V_{in}<0$), the second inverter is controlled to boost the input voltage.

A charging method according to an exemplary embodiment of the present invention may include detecting a connection of a charging plug, detecting a voltage that is input through a neutral point of first and second motors and a voltage of a battery, if the connection of the charging plug is detected, boosting an input voltage by operating a first inverter or a second inverter as a booster depending on a phase of the voltage input through the neutral point of the first and second motors, and charging a battery by operating a voltage transformer as a buck booster or to maintain its switching off condition depending on a relation between the voltage input through the neutral point of the first and second motors and the battery voltage.

If the voltage input through the neutral point of the first and second motors is a positive value ($V_{in}>0$), the first inverter may be operated as a booster, and if the phase of the input voltage is a negative value ($V_{in}<0$), the second inverter may be operated as a booster.

The voltage transformer may be controlled to be a buck booster such that the input voltage that is boosted by the first inverter or the second inverter is repressed to charge the battery, if the voltage input through the neutral point of the first and second motors exceeds the battery voltage.

The voltage transformer may be switched off and the voltage that is boosted by the first inverter or the second inverter may charge the battery, if the voltage input through the neutral point of the first and second motors is less than the battery voltage.

The voltage transformer may bypass the voltage that is boosted by the first inverter or the second inverter to the battery so as to charge the battery, if the voltage input through the neutral point of the first and second motors is less than the battery voltage.

A charging method according to an exemplary embodiment of the present invention may include detecting a voltage that is input through a neutral point of first and second motors and a voltage of a battery, if a connection of a charging plug is detected, operating a first inverter as a booster, if a phase of the voltage that is input through the neutral point of the first and second motors is a positive value ($V_{in}>0$), and operating the second inverter as a booster to boost the voltage, if the phase of the voltage is a negative value ($V_{in}<0$), operating the voltage transformer as a buck booster such that the input voltage that is boosted by the first inverter or the second inverter is suppressed to charge the battery, if the voltage input through the neutral point of the first and second motors exceeds the battery voltage, and switching off the voltage transformer such that the voltage boosted by the first inverter or the second inverter charges the battery, if the voltage input through the neutral point of the first and second motors is less than the battery voltage.

A charging device according to an exemplary embodiment of the present invention may include a battery adapted and configured to store a DC voltage, first and second motors adapted and configured to operate as a motor or a generator, an inverter adapted and configured to operate a motor and boost a voltage supplied to a plug-in, a rectifier adapted and configured to that rectify an AC voltage supplied through the plug-in to supply it to a neutral point of a motor, a voltage transformer adapted and configured to boost the DC voltage of the battery to supply it to the inverter and supplies the voltage boosted by the inverter to supply it to the battery as a charging voltage or suppresses the voltage to supply it to the battery as a charging voltage, and a charging controller adapted and configured to operate the inverter as a booster or operates the voltage transformer as a buck booster to supply the battery with a charging voltage depending on the voltage input to the neutral point of the motor through the plug-in and the voltage of the battery.

The charging device may further include a switch that cuts off a commercial voltage that is supplied to a rectifier through a plug-in according to the control signal of the charging controller, if it is detected that the charging of the battery is completed.

The charging controller may turn off the inverter to bypass the input voltage to the voltage transformer and may operate the voltage transformer as a buck booster to suppress the input voltage, if the voltage that is input through the neutral point of the motor exceeds the battery voltage.

The charging controller may operate the inverter as a booster to boost the input voltage and may continuously turn on an upper side power switch element of the voltage transformer such that the voltage boosted by the inverter is supplied to the battery to charge it, if the voltage that is input through the neutral point of the motor is less than the battery voltage.

A charging method according to an exemplary embodiment of the present invention can include detecting a battery voltage and an input voltage that is transformed to a DC by a rectifier to be input through a neutral point of a motor when a charging plug is connected, controlling the inverter to be turned off, operating a voltage transformer as a buck booster to suppress the input voltage, and supplying the suppressed voltage to the battery to charge it, if the input voltage exceeds the battery voltage, boosting the input voltage by operating the inverter as a booster and continuously turning on an upper side power switch element of a voltage transformer to supply a battery with the boosted voltage as a charging voltage, if the input voltage is less than the battery voltage, and, if charging is completed, prohibiting transmission of a commercial voltage to the neutral point.

A charging method according to an exemplary embodiment of the present invention may include detecting a battery voltage and an input voltage that is transformed to a DC voltage by a rectifier to be input through a neutral point of a motor when a charging plug is connected, boosting the input voltage by operating an inverter as a booster, operating the voltage transformer as a buck booster to suppress the input voltage that is boosted by the inverter and supplying the suppressed voltage to the battery to charge it, if the input voltage exceeds the battery voltage by comparing the input voltage with the battery voltage, turning off the voltage transformer to supply the boosted voltage to the battery as a charging voltage, if the input voltage is less than the battery voltage, and, if charging is completed, prohibiting transmission of a commercial voltage to the neutral point.

In an environmentally-friendly vehicle according to the present invention, a power net disposed therein uses commercial electric power to charge a battery, so an on board charger is unnecessary, cost and weight are reduced, fuel consumption efficiency is improved, and space usage efficiency of the vehicle is improved.

Also, the present invention controls the operation of the voltage transformer and the inverter according to the relation between the input voltage and the battery voltage to minimize the switching loss and improve the power factor for the input voltage, and therefore the charging efficiency is improved.

Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
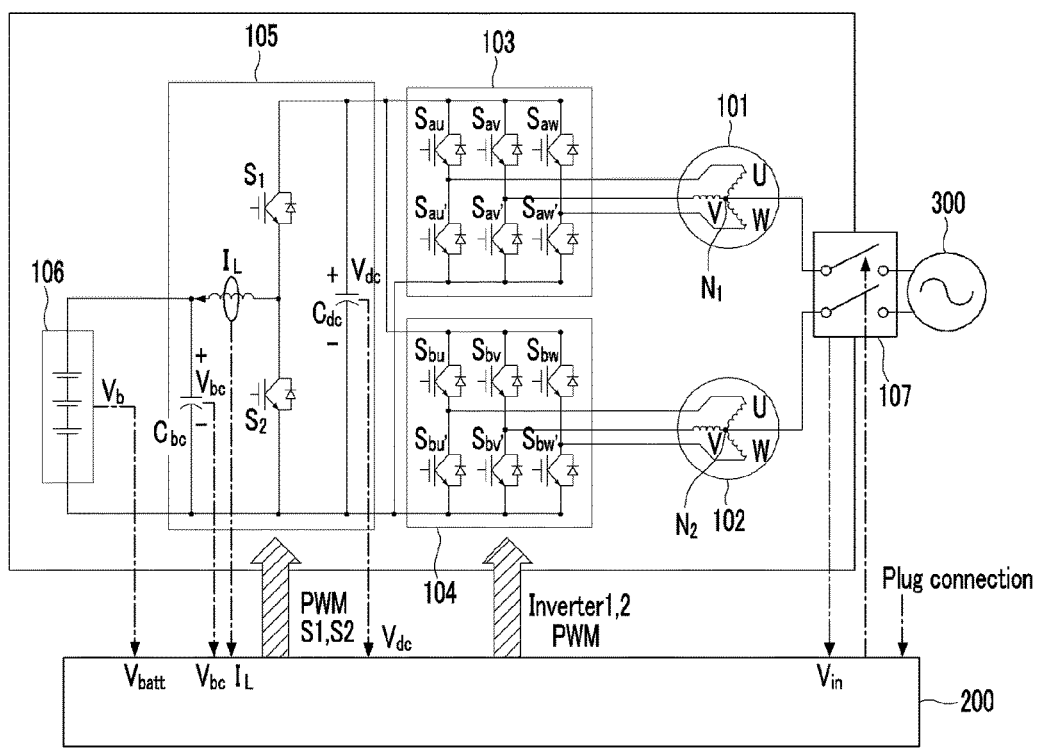
FIG. 1 schematically shows a charging device of an environmentally-friendly vehicle according to a first exemplary embodiment of the present invention.

The following list of reference characters is provided for the reader's convenience:
- 101, 102: first and second motor
- 103, 104: first and second inverter
- 105, 403: voltage transformer
- 106, 404: battery
- 200, 500: charging controller
- 300, 600: commercial electric power
- 405: relay
- 407: rectifier

DETAILED DESCRIPTION OF THE EMBODIMENTS

Hereinafter, the present invention will be described more fully with reference to the accompanying drawings, in which exemplary embodiments of the invention are shown.

As those skilled in the art would realize, the described embodiments may be modified in various different ways, all without departing from the spirit or scope of the present invention.

In order to clarify the present invention, parts that are not connected with the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

FIG. 1 schematically shows a charging device of an environmentally-friendly vehicle according to a first exemplary embodiment of the present invention.

FIG. 1 shows a charging device of an environmentally-friendly vehicle to which two motors are applied.

Referring to FIG. 1, the first exemplary embodiment of the present invention includes a first motor 101, a second motor 102, a first inverter 103, a second inverter 104, a voltage transformer 105, a battery 106, and a charging controller 200.

The first motor 101 is a three-phase AC motor, is operated to start the engine (not shown), and is operated as a generator while the engine is being operated.

The first motor 101 is operated by a three-phase AC voltage that is supplied through the first inverter 103, and generates an AC voltage through torque of the engine to output to the first inverter 103.

The second motor 102 is a three-phase AC motor to rotate a wheel of a vehicle, and generates a driving torque through a three-phase AC voltage that is supplied from the second inverter 104.

Also, the second motor 102 is operated as a generator while the vehicle is in a regenerative braking condition to generate a three-phase AC voltage to the second inverter 104.

The first motor 101 includes a Y connection line type of three-phase coil as a stator coil, wherein one side of the U, V, W-phase coil forming the three-phase coil is connected to form a neutral point N1, and the other side thereof is connected to arms corresponding to the first inverter 103.

The neutral point N1 of the first motor 101 is connected to commercial electric power 300 that is input from the outside.

The second motor 102 includes a Y connection line type three-phase coil as a stator coil, wherein one side of the U, V, W-phase coil is connected to form a neutral point N2, and the other side thereof is connected to arms corresponding to the second inverter 104.

The neutral point N2 of the first motor 102 is connected to commercial electric power 300 that is input from the outside.

The first inverter 103 transforms DC voltage of the battery 106 that is supplied through the voltage transformer 105 to a three-phase AC voltage according to a PWM control signal that is supplied from the charging controller 200 to supply it to the first motor 101 as a driving voltage.

The second inverter 104 transforms DC voltage of the battery 106 that is supplied through the voltage transformer 105 to a three-phase AC voltage according to a PWM control signal that is supplied from the charging controller 200 to supply it to the second motor 102 as a driving voltage.

The first inverter 103 includes a power switching element that is disposed at an upper side and a lower side to be connected in series, and includes a U-phase arm ($S_{au}$, $S_{au'}$), a V-phase arm ($S_{av}$, $S_{av'}$), and a W-phase arm ($S_{aw}$, $S_{aw'}$).

The second inverter 104 includes a power switching element that is disposed at an upper side and a lower side to be connected in series, and includes a U-phase arm ($S_{bu}$, $S_{bu'}$), a V-phase arm ($S_{bv}$, $S_{bv'}$), and a W-phase arm ($S_{bw}$, $S_{bw'}$).

The power switching element can include one of a NPN type transistor, an IGBT (Insulated Gate Bipolar Transistor), and a MOSFET.

If the commercial electric power 300 is input through a plug-in connection, the first inverter 103 and the second inverter 104 boost or bypass the voltage that is supplied through the neutral point N1 of the first motor 101 and the neutral point N2 of the second motor 102 according to a PWM control signal that is supplied from the charging controller 200 to supply it to the voltage transformer 105.

The voltage transformer 105 is a DC/DC converter boosts or represses the DC voltage that is supplied from the battery 106 to a predetermined level of voltage according to a PWM control signal that is supplied from the charging controller 200 to output it to the first inverter 103 or the second inverter 104.

Also, the voltage transformer 105 boosts or represses the DC voltage that is supplied through the first inverter 103 and the second inverter 104 according to a PWM control signal that is supplied from the charging controller 200 to supply it to the battery 106 as a charging voltage.

The voltage transformer 105 is connected to both terminals of the battery 106, and includes a first power switching element $S_1$ and a second power switching element $S_2$ that are connected to a DC link capacitor ($C_{dc}$) in series and a smoothing capacitor ($C_{bc}$) that smoothes a voltage variation between both terminals of the battery 106.

If the outside commercial electric power 300 that is supplied to a neutral point N1 of the first motor 101 and a neutral point of the second motor M2 can be charged in the DC link capacitor ($V_{dc}$) in which a circulating path is formed through the first inverter 103 and the second inverter 104 according to a control signal that is supplied from the charging controller 200, the voltage transformer 105 charges the battery 106 by switching the first power switching element $S_1$ and the second power switching element $S_2$.

The battery 106 can include at least one of a nickel-hydrogen battery, a lithium-ion rechargeable battery, and a large capacity capacitor as a DC power source to store a high voltage for operating an environmentally-friendly vehicle.

Also, the battery 106 can be charged by the outside commercial electric power 300 that is boosted or repressed by the voltage transformer 105.

The commercial electric power 300 can be connected by a plug-in connection or a connector connection.

It is desirable that the commercial electric power 300 is AC power, but DC power can be applied as the power 300 in the present invention.

If the commercial electric power 300 is connected by a plug-in connection, the charging controller 200 detects an AC voltage ($V_{in}$) that is input through a neutral point N1 of the first motor 101 and a neutral point N2 of the second motor 102, a voltage ($V_{dc}$) of a DC link capacitor ($C_{dc}$) in which a circulation loop is formed, a voltage ($V_{batt}$) of a battery 106, a voltage ($V_{bc}$) of a smoothing capacitor ($C_{bc}$) that is connected to both ends of the battery 106, and a current ($I_L$) of an inductor to determine a charging mode.

The charging controller 200 determines a charging control value according to the determined charging mode and uses a PWM control signal to switch the first inverter 103, the second inverter 104, and the voltage transformer 105 to charge the battery 106.

The charging controller 200 compares the input voltage ($V_{in}$) that is input through the commercial electric power 300 with the voltage ($V_{batt}$) of the input voltage ($V_{in}$), and if it is determined that the Input voltage ($V_{in}$) exceeds the voltage ($V_{batt}$) of the battery 106, it controls the switching of the voltage transformer 105 to be operated as a buck booster.

Accordingly, the voltage of the DC link capacitor ($C_{dc}$) is repressed to a predetermined constant voltage by the switching of the voltage transformer 105 that is operated as a buck booster and the repressed voltage is supplied to the battery 106 to charge it.

At this time, the charging controller 200 turns off the switching of the first inverter 103 and the second inverter 104 to prevent an unnecessary switching loss of the first inverter 103 and the second inverter 104.

Also, the charging controller 200 compares the input voltage ($V_{in}$) of the commercial electric power 300 that is input with the voltage ($V_{batt}$) of the battery 106, and if the voltage of the battery 106 exceeds the input voltage ($V_{in}$), it operates the switching of the first inverter 103 and the second inverter 104 as a booster to transform the input voltage ($V_{in}$) to a DC voltage and simultaneously to boost it to a constant voltage such that it is stored in a DC link capacitor ($C_{dc}$) of the voltage transformer 105.

In this process, if the phase of the AC voltage ($V_{in}$) that is input through the neutral point N1 of the first motor 101 and the neutral point N2 of the second motor 102 is a positive value ($V_{in}>0$), the charging controller 200 conducts electricity through an upper side U-phase arm ($S_{au}$), a V-phase arm ($S_{av}$), and a W-phase arm ($S_{aw}$) of a power switching element forming the first inverter 103 and turns off a power switching element forming the second inverter 104.

Accordingly, a circulation loop of the commercial electric power 300 to the neutral point N1 of the first motor 101 to the upper side arm of the first inverter 103 to the DC link capacitor ($C_{dc}$) of the voltage transformer 105 to a freewheeling diode that is formed at a lower side arm of the second inverter 104 to the neutral point of the second motor 102 to the commercial electric power 300 is formed.

In this process, the AC voltage ($V_{in}$) that is input through the neutral point N1 of the first motor 101 is transformed by the switching operation of the upper side U-phase arm ($S_{au}$), V-phase arm ($S_{av}$), and W-phase arm ($S_{aw}$) of the first inverter 103 to a DC voltage and is simultaneously boosted to a predetermined constant voltage to be stored in the DC link capacitor ($C_{dc}$) in the voltage transformer 105.

Further, if the phase of the AC voltage ($V_{in}$) that is input through the neutral point N1 of the first motor 101 and the neutral point N2 of the second motor 102 is a negative value ($V_{in}<0$), the charging controller 200 conducts electricity through an upper side U-phase arm ($S_{bu}$), a V-phase arm ($S_{bv}$), and a W-phase arm ($S_{bw}$) of a power switching element forming the second inverter 104 and continuously turns off the power switching element forming the first inverter 103.

Accordingly, a circulation loop of the commercial electric power 300 to the neutral point N2 of the second motor 102 to an upper side arm of the second inverter 104 to the DC link capacitor ($C_{dc}$) of the voltage transformer 105 to a freewheeling diode that is formed at a lower side arm of the first inverter 103 to the neutral point of the first motor 101 to the commercial electric power 300 is formed.

In this process, the AC voltage ($V_{in}$) that is input through the neutral point N2 of the second motor 102 is transformed to a DC voltage and is simultaneously boosted to a predetermined constant voltage by the switching operation of an upper side U-phase arm ($S_{bu}$), a V-phase arm ($S_{bv}$), and a W-phase arm ($S_{bw}$) of the second inverter 104 that is operated as a booster to be stored in the DC link capacitor ($C_{dc}$) of the voltage transformer 105.

When the voltage of the battery 106 exceeds the input voltage ($V_{in}$) and the first inverter 103 and the second inverter 104 are operated as a booster, the charging controller 200 only turns on an upper side power switching element S1 of the voltage transformer 105 such that the voltage that is boosted by the first inverter 103 and the second inverter 104 is supplied to the battery 106 to charge it.

Also, the charging controller 200 operates the first inverter 103 or the second inverter 104 as a booster to boost the input voltage ($V_{in}$) according to the phase of the input voltage ($V_{in}$), and if the input voltage ($V_{in}$) exceeds the battery 106 voltage ($Vb_{att}$), the controller 200 operates the voltage transformer 105 as a buck booster such that the input voltage ($V_{in}$) that is boosted by the first inverter 103 or the second inverter 104 is repressed to charge the battery 106.

Also, the charging controller 200 operates the first inverter 103 or the second inverter 104 as a booster to boost the input voltage ($V_{in}$) according to the phase of the input voltage ($V_{in}$), and if the battery 106 voltage ($V_{batt}$) exceeds the input voltage ($V_{in}$), the charging controller 200 turns off the voltage transformer 105 such that the input voltage ($V_{in}$) boosted by the first inverter 103 or the second inverter 104 is supplied as it is to the battery 106 as a charging voltage.

The charging controller 200 uses the commercial electric power 300 to charge the battery 106 according to the above processes, and if the battery 106 is completely charged, a relay 107 is turned off to cut off the commercial electric power 300 such that the battery 106 is not overcharged.

Figure 2:
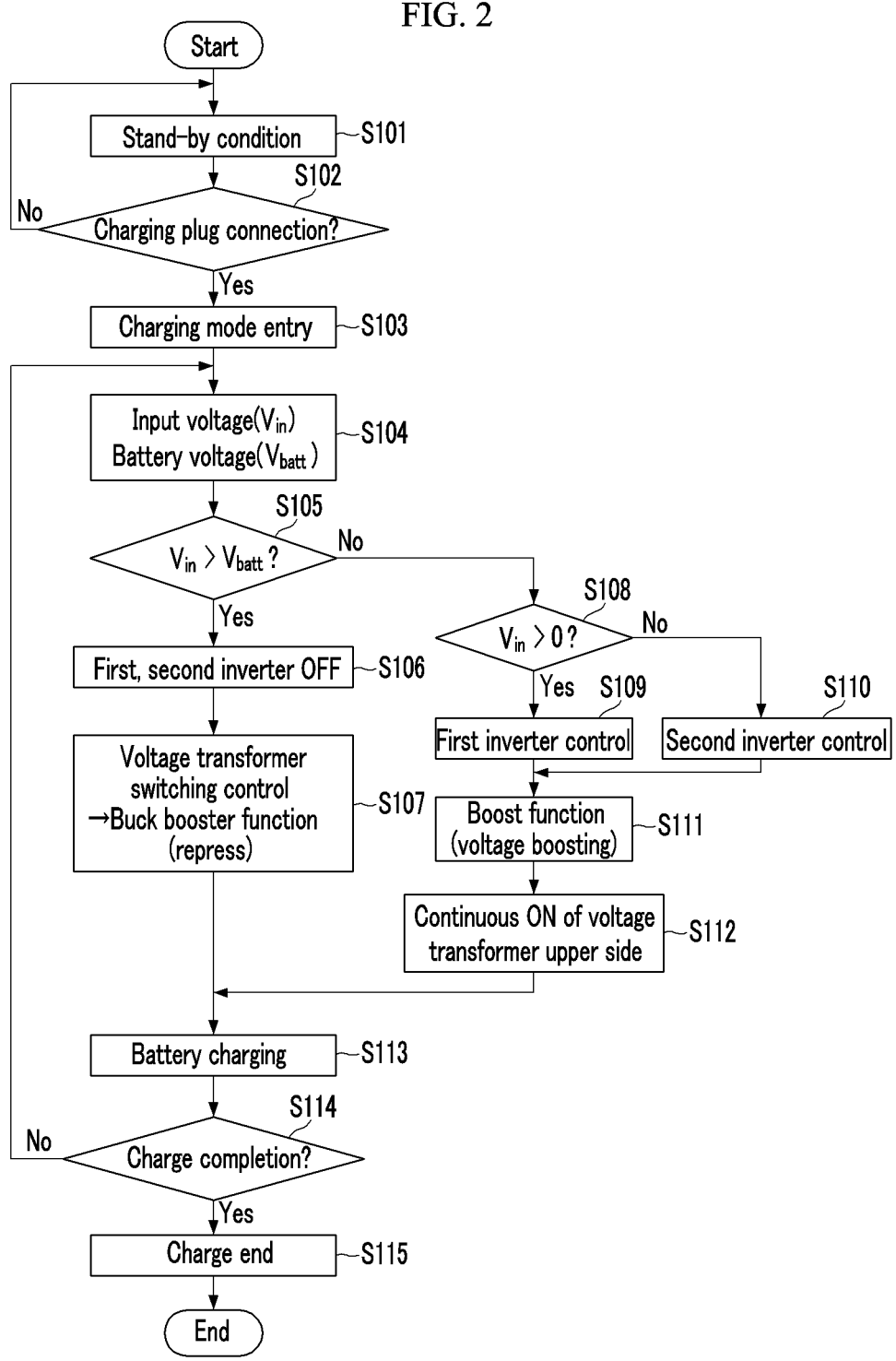
FIG. 2 is a flowchart schematically showing a first charging procedure in a charging device of an environmentally-friendly vehicle according to a first exemplary embodiment of the present invention.

FIG. 2 is a flowchart schematically showing a first charging procedure in a charging device of an environmentally-friendly vehicle according to a first exemplary embodiment of the present invention.

Referring to FIG. 2, the environmentally-friendly vehicle according to the present invention stands by (S101), and the charging controller 200 detects whether a plug-in for charging is connected to the outside commercial electric power 300 (S102).

If the charging plug in is detected in step S102, it enters into a charging mode in step S103, and the charging controller 200 detects a battery 106 voltage ($V_{batt}$) and an input voltage ($V_{in}$) of the commercial electric power 300 that is input through the neutral point N1 of the first motor 101 and the neutral point N2 of the second motor 102 in step S104.

And, the charging controller 200 compares the battery 106 voltage ($V_{batt}$) with the input voltage (Vin) that is detected in step S104 and determines whether the input voltage ($V_{in}$) that is input through the neutral point N1 of the first motor 101 and the neutral point N2 of the second motor 102 exceeds the battery 106 voltage ($V_{batt}$) in step S105.

If the input voltage ($V_{in}$) that is input through the neutral point N1 of the first motor 101 and the neutral point N2 of the second motor 102 exceeds the battery 106 voltage ($V_{batt}$) in step S105, the charging controller 200 turns off the first inverter 103 and the second inverter 104 such that the input voltage ($V_{in}$) is bypassed in step S106.

That is, the first inverter 103 and the second inverter 104 are controlled to be turned off, and the unnecessary switching operation for boosting the voltage does not occur to save the switching loss in a condition that a high voltage is input.

In this process, the charging controller 200 controls an upper side power switching element $S_1$ and a lower side power switching element $S_2$ forming the voltage transformer 105 to operate as a buck booster such that the input voltage ($V_{in}$) that is input through the first inverter 103 and the second inverter 104 is repressed to a predetermined voltage in step S107 to supply it to the battery 106 as a charging voltage in step S113.

If it is determined that the battery 106 voltage ($V_{batt}$) exceeds the input voltage ($V_{in}$) that is input through the neutral point N1 of the first motor 101 and the neutral point N2 of the second motor 102 in step S105, the charging controller 200 determines whether the phase of the input voltage ($V_{in}$) is a positive value ($V_{in}>0$) in step S108.

If the phase of the input voltage ($V_{in}$) that is input through the neutral point N1 of the first motor 101 and the neutral point N2 of the second motor 102 has a positive value ($V_{in}$>0) in step S108, the charging controller 200 switches the first inverter 103 through a PWM control signal to transform the input voltage (Vin) that is input through the neutral point N1 of the first motor 101 and the neutral point N2 of the second motor 102 to a DC voltage and simultaneously performs a booster function such that it is boosted to a predetermined level in step S109.

For example, the charging controller 200 conducts electricity through an upper side U-phase arm ($S_{au}$), V-phase arm ($S_{av}$), and W-phase arm ($S_{aw}$) of the power switching element forming the first inverter 103, and turns off the power switching element forming the second inverter 104.

Accordingly, a circulation loop of the commercial electric power 300 to the neutral point N1 of the first motor 101 to an upper side arm of the first inverter 103 to a DC link capacitor ($C_{dc}$) of the voltage transformer 105 to a freewheeling diode that is formed at a lower side arm of the second inverter 104 to the neutral point N2 of the second motor 102 to a commercial electric power 300 is formed.

In this process, the AC voltage ($V_{in}$) that is input through the neutral point N1 of the first motor 101 is transformed to a DC voltage by the switching operation of an upper side U-phase arm ($S_{au}$), a V-phase arm ($S_{av}$), and a W-phase arm ($S_{aw}$) of the first inverter 103 that is operated as a booster, and is simultaneously boosted to a predetermined voltage and supplied to the voltage transformer 105 in to be S111.

If the phase of the input voltage ($V_{in}$) that is input through the neutral point N1 of the first motor 101 and the neutral point N2 of the second motor 102 has a negative value ($V_{in}$<0) in step S108, the charging controller 200 switches the second inverter 104 through a PWM control signal to transform the input voltage ($V_{in}$) that is input through the neutral point N1 of the first motor 101 and the neutral point N2 of the second motor 102 to a DC voltage and simultaneously performs a booster function to boost it to a predetermined level in step S110.

For example, the charging controller 200 conducts electricity through an upper side U-phase arm ($S_{bu}$), a V-phase arm ($S_{bv}$), and a W-phase arm ($S_{bw}$) of the power switching element forming the second inverter 104 and maintains the turned-off condition of the power switching element forming the first inverter 103.

Accordingly, a circulation loop of the commercial electric power 300 to the neutral point of the second motor 102 N2 to an upper side arm of the second inverter 104 to a DC link capacitor ($C_{dc}$) of the voltage transformer 105 to a freewheeling diode that is formed at a lower side arm of the first inverter 103 to a neutral point of the first motor 101 to the commercial electric power 300 is formed.

In this process, the AC voltage ($V_{in}$) that is input through the neutral point N2 of the second motor 102 is transformed to a DC voltage by the switching operation of an upper side U-phase arm ($S_{bu}$), a V-phase arm ($S_{bv}$), and a W-phase arm ($S_{bw}$) of the second inverter 104, and is simultaneously boosted to a predetermined constant voltage to be supplied to the voltage transformer 105 (S111).

Further, the charging controller 200 transforms the AC voltage that is input through the neutral point N1 of the first motor 101 and the neutral point N2 of the second motor M2 to a DC voltage, simultaneously boosts the DC voltage to supply it to the voltage transformer 105, and continuously turns on an upper side power switching element $S_1$ of the voltage transformer 105 (S112).

Accordingly, the voltage that is boosted through the first inverter 103 and the second inverter 104 is supplied to the battery 106 to charge the battery 106 (S113).

In this moment, the unnecessary switching operation of the first inverter 103 and the second inverter 104 is not generated on the voltage transformer 105 and therefore the switching loss is not formed.

The charging controller 200 uses the outside commercial electric power 300 to charge the battery 106 along the above processes, and if it is determined that the battery 106 is completely charged (S114), the relay 107 is turned off to cut off the commercial electric power 300 so as to not overcharge the battery 106 and the charging procedure ends (S115).

Figure 3:
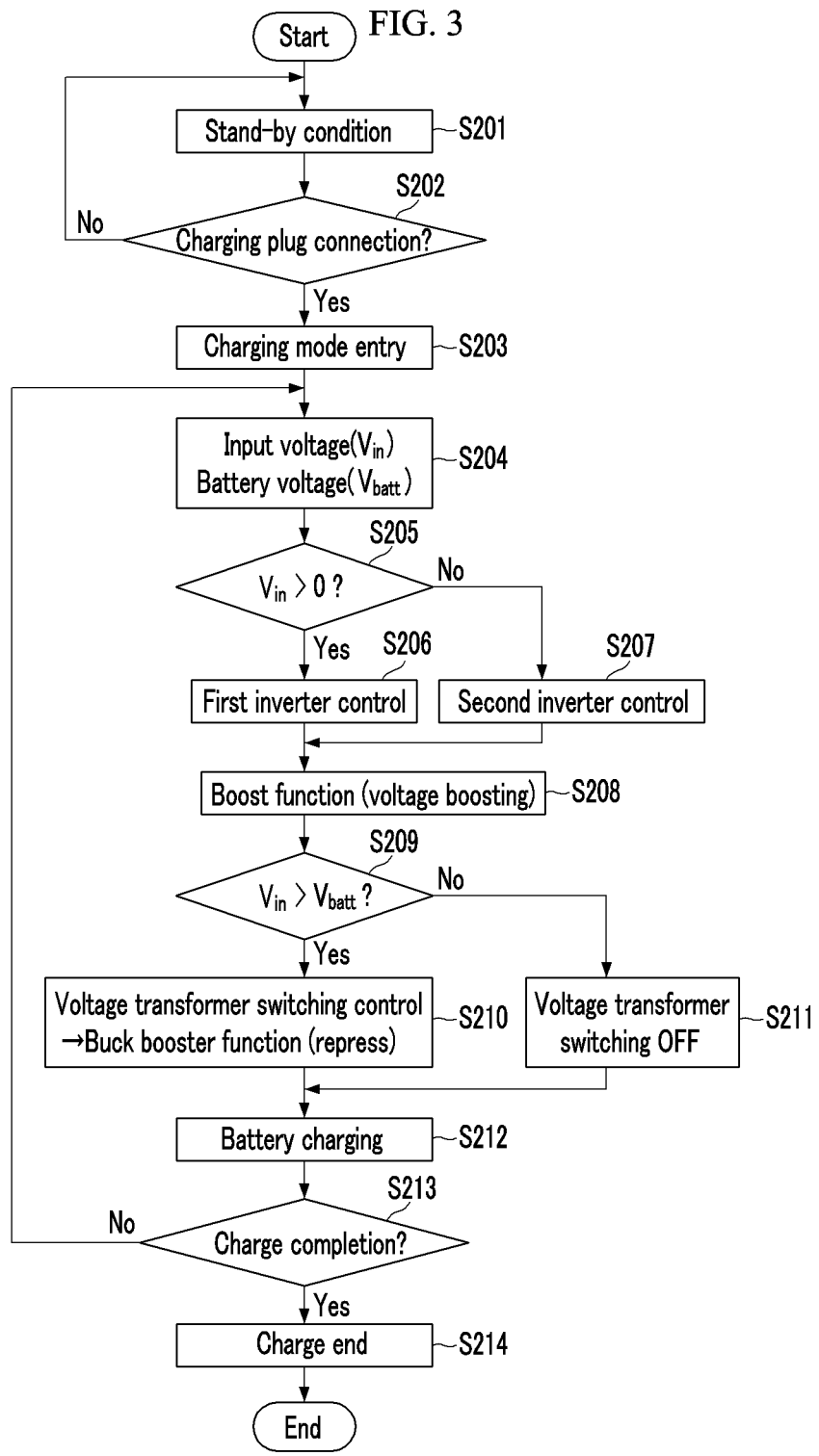
FIG. 3 is a flowchart schematically showing a second charging procedure in a charging device of an environmentally-friendly vehicle according to a first exemplary embodiment of the present invention.

FIG. 3 is a flowchart schematically showing a second charging procedure in a charging device of an environmentally-friendly vehicle according to a first exemplary embodiment of the present invention.

Referring to FIG. 3, in a stand-by mode in which the environmentally-friendly vehicle is waiting for charging of the battery 106 (S201), the charging controller 200 determines whether a charging plug that connects the commercial electric power 300 is plugged in (S202).

In step S202, if it is determined that the charging plug is attached, the charging controller 200 enters into a charging mode (S203) and detects the input voltage ($V_{in}$) of the commercial electric power 300 that is input through the neutral point N1 of the first motor 101 and the neutral point N2 of the second motor 102 and the voltage ($V_{batt}$) of the battery 106 (S204).

Thereafter, the charging controller 200 determines whether the phase of the input voltage ($V_{in}$) that is input through the neutral point N1 of the first motor 101 and the neutral point N2 of the second motor 102 has a positive value ($V_{in}$>0) (S205).

In step S205, if the phase of the input voltage ($V_{in}$) that is input through the neutral point N1 of the first motor 101 and the neutral point N2 of the second motor 102 has a positive value ($V_{in}$>0), the charging controller 200 uses a PWM control signal to perform the switching of the first inverter 103 such that the input voltage (Vin) that is input through the neutral point N1 of the first motor 101 is transformed to a DC voltage and is simultaneously boosted to a predetermined level (S206).

For example, the charging controller 200 conducts electricity through an upper side U-phase arm ($S_{au}$), a V-phase arm ($S_{av}$), and a W-phase arm ($S_{aw}$) of a power switching element forming the first inverter 103, and maintains the turned off condition of the power switching element forming the second inverter 104.

Accordingly, a circulation loop of the commercial electric power 300 to the neutral point N1 of the first motor 101 to an upper side arm of the first inverter 103 to a DC link capacitor ($C_{dc}$) of the voltage transformer 105 to a freewheeling diode formed at a lower side arm of the second inverter 104 to the neutral point of the second motor 102 to the commercial electric power 300 is formed.

In this process, an AC voltage ($V_{in}$) that is input through the neutral point N1 of the first motor 101 is transformed to a DC voltage by the switching operation of an upper side U-phase arm ($S_{au}$), a V-phase arm ($S_{av}$), and a W-phase arm ($S_{aw}$) of the first inverter 103 that is operated as a booster, and is simultaneously boosted to a predetermined uniform voltage to be supplied to the DC link capacitor ($C_{dc}$) formed in the voltage transformer 105 (S208).

In step S205, if the phase of the input voltage ($V_{in}$) that is input through the neutral point N1 of the first motor 101 and the neutral point N2 of the second motor 102 has a negative value ($V_{in}$<0), the charging controller 200 uses a PWM control signal to operate the switching of the second inverter 104 to transform the input voltage ($V_{in}$) that is input through the neutral point N2 of the second motor 102 to a DC voltage and simultaneously boosts it to a predetermined level (S207).

For example, the charging controller 200 conducts electricity of an upper side U-phase arm ($S_{bu}$), a V-phase arm ($S_{bv}$), and a W-phase arm ($S_{bw}$) of the power switching element forming the second inverter 104, and maintains the turned off condition of the power switching element forming the first inverter 103.

Accordingly, a circulation loop of the commercial electric power 300 to the neutral point N2 of the second motor 102 to an upper side arm of the second inverter 104 to a DC link capacitor ($C_{dc}$) of the voltage transformer 105 to a freewheeling diode formed at a lower side arm of the first inverter 103 to a neutral point of the first motor 101 to the commercial electric power 300 is formed.

In this process, the AC voltage ($V_{in}$) that is input through the neutral point N2 of the second motor 102 is transformed to a DC voltage by the switching operation of an upper side U-phase arm ($S_{bu}$), a V-phase arm ($S_{bv}$), and a W-phase arm ($S_{bw}$) of the second inverter 104, and is simultaneously boosted to a predetermined constant voltage to be supplied to the DC link capacitor ($C_{dc}$) that is formed in the voltage transformer 105 (S208).

As described above, in a condition in which the input voltage ($V_{in}$) is boosted by the first inverter 103 and the second inverter 104 to be stored in the DC link capacitor ($C_{dc}$) that is formed in the voltage transformer 105, the charging controller 200 determines whether the input voltage ($V_{in}$) exceeds the voltage ($V_{batt}$) of the battery 106 (S209).

In step S209, if it is determined that the input voltage ($V_{in}$) exceeds the voltage ($V_{batt}$) of the battery 106, the charging controller 200 controls the switching of an upper side power switching element $S_1$ and a lower side power switching element $S_2$ forming the voltage transformer 105 to be operated as a buck booster, and the charging controller 200 represses the input voltage ($V_{in}$) that is boosted by the first inverter 103 and the second inverter 104 to a predetermined voltage (S210) to supply it to the battery 106 as a charging voltage (S212).

That is, because the input voltage ($V_{in}$) that is boosted by the first inverter 103 and the second inverter 104 exceeds a rated voltage for charging the battery 105, the voltage is repressed to the rated voltage to be supplied to the battery 106.

However, if the input voltage ($V_{in}$) is less than the voltage ($V_{batt}$) of the battery 106 in step S209, the input voltage ($V_{in}$) that is boosted by the first inverter 103 and the second inverter 104 does not exceed the rated voltage for charging the battery 105, and therefore the charging controller 200 maintains the voltage transformer 105 in a switching off condition (S211).

Accordingly, the input voltage ($V_{in}$) that is boosted by the first inverter 103 and the second inverter 104 is supplied to the battery 106 intact as a charging voltage, and the switching loss of the voltage transformer 105 is not generated (S212).

In a condition that the battery 106 can be charged by the commercial electric power 300, the charging controller 200 determines whether the charging of the battery 106 is completed (S213).

If it is determined that the battery 106 is completely charged in step S213, the charging controller 200 turns off the relay 107 to cut off the input of the commercial electric power 300 and ends the charging operation such that the battery 106 is not overcharged (S214).

Figure 4:
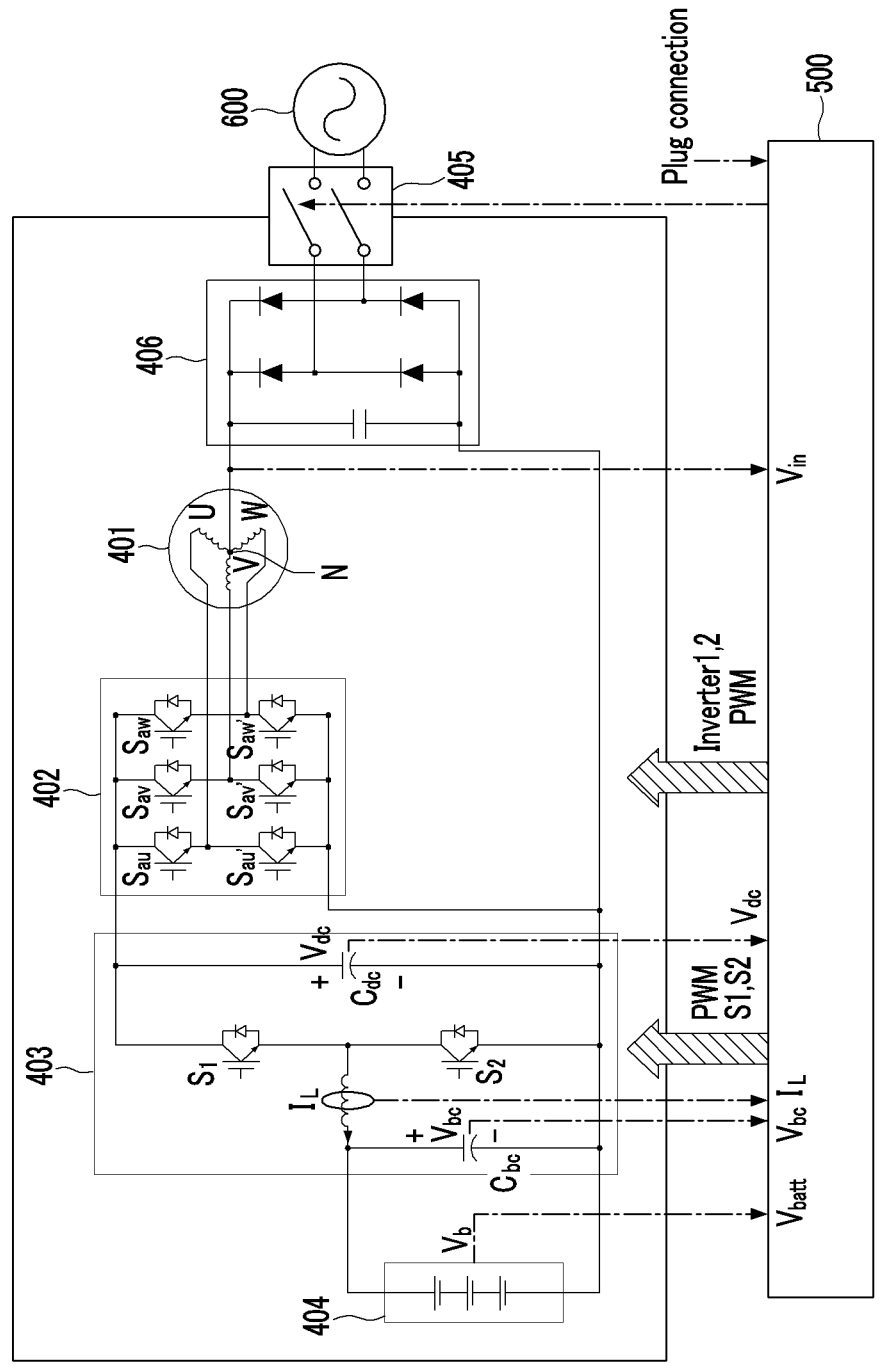
FIG. 4 schematically shows a charging device of an environmentally-friendly vehicle according to a first exemplary embodiment of the present invention.

FIG. 4 schematically shows a charging device of an environmentally-friendly vehicle according to a first exemplary embodiment of the present invention.

FIG. 4 is a drawing showing a charging device of an environmentally-friendly vehicle in which one motor is applied.

Referring to FIG. 4, the second exemplary embodiment of the present invention includes a motor 401, an inverter 402, a voltage transformer 403, a battery 404, a relay 405, a rectifier 406, and a charging controller 500.

The motor 401 is a three-phase AC type for rotating a wheel, and uses a three-phase AC voltage that is supplied from the inverter 402 to generate a driving torque.

Also, the motor 401 is operated for regenerative braking of a vehicle to output a three-phase AC voltage that is transferred to the inverter 402.

The motor 401 includes a Y connection line type three-phase coil as a stator coil, wherein one side of U, V, W-phase coil forming a three-phase coil is connected to form a neutral point N1, and the other side thereof is connected to arms corresponding to the inverter 402.

The neutral point N1 of the motor 401 is connected to a commercial electric power 600 that is input from the outside.

The inverter 402 transforms DC voltage of the battery 404 that is supplied through the voltage transformer 403 to a three-phase AC voltage according to a PWM control signal that is supplied from the charging controller 500 to supply it to the motor 401 as a driving voltage.

If the commercial electric power 600 is input through a plug-in connection, the inverter 402 boosts or bypasses the voltage that is supplied through the neutral point N of the motor 401 according to a PWM control signal that is supplied from the charging controller 500 to supply it to the voltage transformer 403.

The inverter 402 includes a power switching element that is disposed at an upper side and a lower side to be connected in series, and includes a U-phase arm ($S_{bu}$, $S_{bu'}$), a V-phase arm ($S_{bv}$, $S_{bv'}$), and a W-phase arm ($S_{bw}$, $S_{bw'}$).

The power switching element can include one of am NPN type transistor, an IGBT (Insulated Gate Bipolar Transistor), and a MOSFET.

The voltage transformer 403 that is a DC/DC converter boosts or represses the DC voltage that is supplied from the battery 404 to a predetermined level of voltage according to a PWM control signal that is supplied from the charging controller 500 to output it to the inverter 402.

Also, the voltage transformer 403 boosts or represses the DC voltage that is supplied through the inverter 402 according to a PWM control signal that is supplied from the charging controller 500 to supply it to the battery 404 as a charging voltage.

The voltage transformer 403 is connected to both ends of the battery 404, and includes a first power switching element $S_1$ and a second power switching element $S_2$ that are connected to a DC link capacitor ($C_{dc}$) in series and a smoothing capacitor ($C_{bc}$) that smoothes a voltage variation between both ends of the battery 404.

If the outside commercial electric power 600 that is supplied to a neutral point N of the motor M can be charged in the DC link capacitor ($V_{dc}$) in which a circulating path is formed through the inverter 402 according to a control signal that is supplied from the charging controller 500, the voltage transformer 403 charges the battery 404 by switching the first power switching element $S_1$ and the second power switching element $S_2$.

The battery 404 can include at least one of a nickel-hydrogen battery, a lithium-ion rechargeable battery, and a large capacity capacitor as a DC power source to store a high voltage for operating an environmentally-friendly vehicle.

Also, the battery 404 can be charged by the electric power that is supplied from the voltage transformer 403.

If the charging of the battery 404 is completed, the relay 405 is switched by a control signal that is transmitted from the charging controller 500 to cut off the input of the commercial electric power 600.

The rectifier 406 transforms the AC type of commercial electric power 600 to a DC voltage to supply it to the neutral point (N) of the motor 401.

If the commercial electric power 600 is connected by a plug-in, the charging controller 500 detects an AC voltage ($V_{in}$) that is input through a neutral point N of the motor 401, a voltage ($V_{dc}$) of a DC link capacitor ($C_{dc}$) in which a circulation loop is formed, a voltage ($V_{batt}$) of a battery 404, a voltage ($V_{bc}$) of a smoothing capacitor ($C_{bc}$) that is connected to both ends of the battery 404, and a current ($I_L$) of an inductor to determine a charging mode.

The charging controller 500 uses a PWM control signal to switch the inverter 402, and the voltage transformer 403 to charge the battery 404 in a charging mode.

If the outside voltage is input through the rectifier 406, the charging controller 500 compares the input voltage ($V_{in}$) and the battery 404 voltage ($V_{batt}$) and turns off the switching of the inverter 402 if the input voltage ($V_{in}$) exceeds the battery 404 voltage ($V_{batt}$).

Accordingly, the inverter 402 bypasses the input voltage ($V_{in}$) that is input through a neutral point N of the motor 401 such that the voltage is stored in the DC link capacitor ($C_{dc}$) of the voltage transformer 403.

In this process, the charging controller 500 controls the switching of the voltage transformer 403 to be operated as a buck booster such that the voltage stored in the DC link capacitor ($C_{dc}$) is repressed to a rated voltage to be supplied to the battery 404 as a charging voltage.

Also, the charging controller 500 compares the input voltage ($V_{in}$) with the battery 404 voltage ($V_{batt}$), and if the battery 404 voltage exceeds the input voltage ($V_{in}$), the controller 500 operates the inverter 402 as a booster to boost the input voltage ($V_{in}$) and stores the boosted voltage in the DC link capacitor ($C_{dc}$) of the voltage transformer 403.

In this process, the charging controller 500 continuously turns on an upper side power switch element $S_1$ of the voltage transformer 403 such that the voltage that is boosted by the inverter 402 is supplied to the battery 404 intact as a charging voltage.

Also, if the outside voltage that is rectified by the rectifier 406 through the plug-in is input, the charging controller 500 operates the inverter 402 as a booster to boost the input voltage ($V_{in}$) and the boosted voltage is stored to the DC link capacitor ($C_{dc}$) of the voltage transformer 403.

Further, the charging controller 500 compares the input voltage ($V_{in}$) with the battery 404 voltage ($V_{batt}$), and if the input voltage ($V_{in}$) exceeds the battery 404 voltage ($V_{batt}$), the controller 500 controls the switching of the voltage transformer 403 to be operated as a buck booster such that the voltage stored in the DC link capacitor ($C_{dc}$) is repressed to be supplied to the battery 404 as a charging voltage.

Also, the charging controller 500 compares the input voltage ($V_{in}$) with the battery 404 voltage ($V_{batt}$), and if the battery 404 voltage exceeds the input voltage ($V_{in}$), the charging controller 500 maintains the turned off condition of the voltage transformer 403 such that the voltage that is boosted by the inverter 402 is supplied to the battery 404 as a charging voltage.

In accordance with the above processes, the charging controller 500 uses the outside commercial electric power 600 to charge the battery 404, and if the battery 404 is completely charged, the controller 500 turns off the relay 405 to cut off the input of the commercial electric power 600 such that the battery 404 is not overcharged.

The commercial electric power 600 can be connected by a plug-in connection or a connector connection.

It is desirable that the commercial electric power 600 is an AC power, but DC power can be applied as the power 600 in the present invention.

Figure 5:
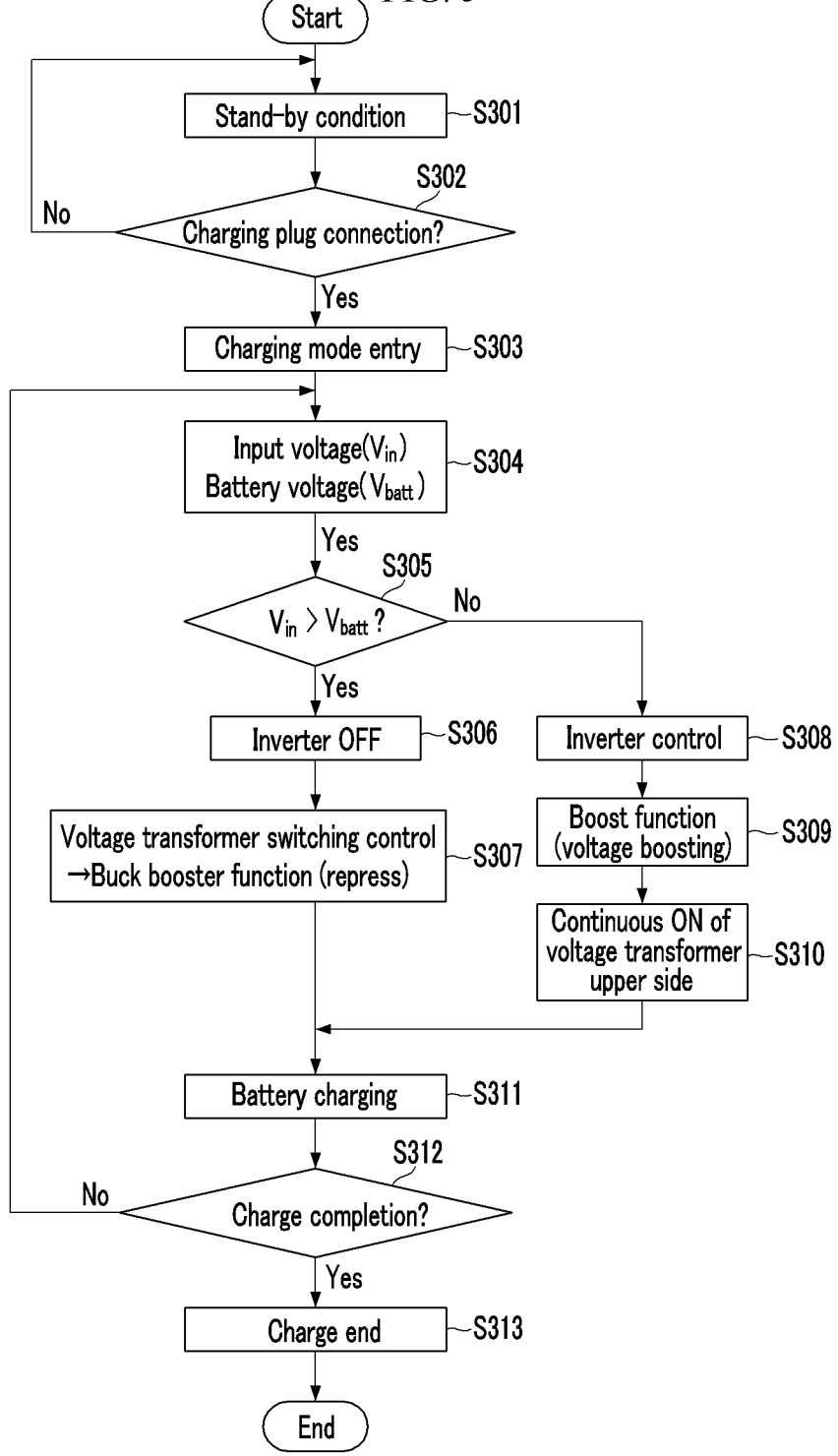
FIG. 5 is a flowchart schematically showing a first charging procedure in a charging device of an environmentally-friendly vehicle according to a first exemplary embodiment of the present invention.

FIG. 5 is a flowchart schematically showing a first charging procedure in a charging device of an environmentally-friendly vehicle according to a first exemplary embodiment of the present invention.

Referring to FIG. 5, the environmentally-friendly vehicle according to the present invention stands by (S301), and the charging controller 500 detects whether a plug-in for charging is connected to the outside commercial electric power 600 (S302).

If the commercial electric power 600 is connected as a plug-in in step S302, the charging controller 500 enters into a charging mode (S303), and detects the battery 404 voltage ($V_{batt}$) and the input voltage ($V_{in}$) that is input through the neutral point (N) of the motor 401 that is transformed to a DC voltage through the rectifier 406 (S304).

Further, the charging controller 500 compares the input voltage (Vin) and the battery 404 voltage that is detected in step S304 and determines whether the input voltage ($V_{in}$) is larger than the battery 404 voltage ($V_{batt}$) (S305).

If the input voltage ($V_{in}$) exceeds the battery 404 voltage ($V_{batt}$) in step S305, the charging controller 500 turns off the inverter 402 to bypass the input voltage ($V_{in}$) such that the voltage is stored in the DC link capacitor ($C_{dc}$) that is formed in the voltage transformer 403 (S306).

That is, because the inverter 402 is controlled in an off condition, the switching operation for boosting the voltage is not generated and the switching loss is not formed.

In this process, the charging controller 500 controls the switching of an upper side power switching element $S_1$ and a lower side power switching element $S_2$ forming the voltage transformer 403 to be operated as a buck booster (S307) such that the rated charging voltage is repressed to be supplied to the battery 404 as a charging voltage (S311).

If it is determined that the battery 404 voltage ($V_{batt}$) exceeds the input voltage ($V_{in}$) in step S305, the charging controller 500 switches the inverter 402 to be operated as a booster through a PWM control signal (S308) such that the input voltage ($V_{in}$) is boosted to a rated charging voltage (S309).

In this process, the voltage that is boosted by the inverter 402 is stored in the DC link capacitor ($C_{dc}$) inside the voltage transformer 403.

Further, the charging controller 500 controls an upper side power switching element $S_1$ of the voltage transformer 403 to be continuously turned on (S310).

Accordingly, the voltage that is boosted by the inverter 402 is supplied to the battery 404 as a charging voltage (S311).

In this process, the voltage transformer 402 does not generate an unnecessary switching operation for boosting or repressing the voltage and therefore the switching loss does not occur.

The charging controller 500 uses the commercial electric power 600 to charge the battery 404 according to the above procedures, and if the battery 404 is completely charged (S312), the relay 405 is turned off to cut off the input of the commercial electric power 600 such that the battery 404 is not overcharged, and then the charging ends (S313).

Figure 6:
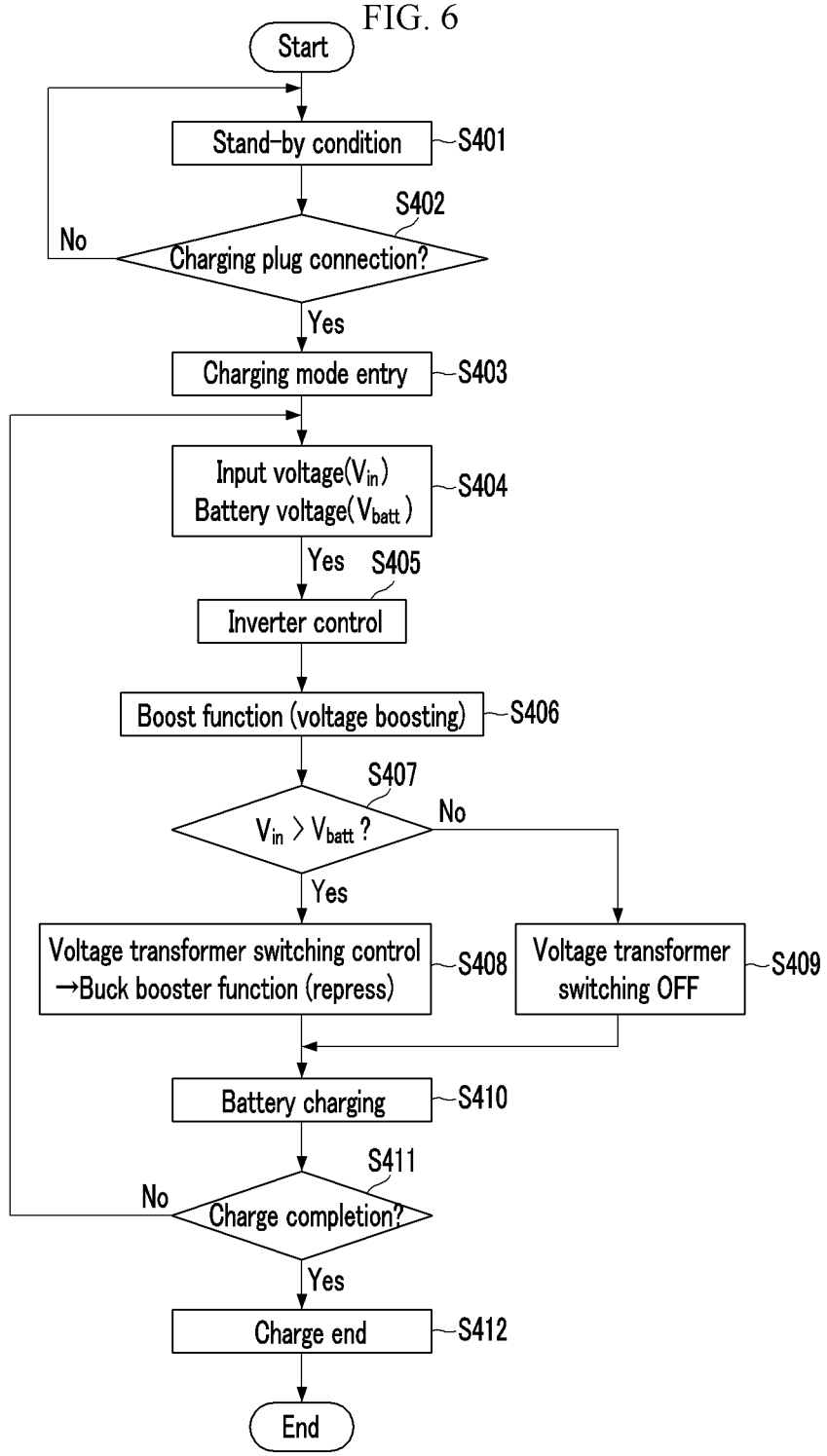
FIG. 6 is a flowchart schematically showing a second charging procedure in a charging device of an environmentally-friendly vehicle according to a first exemplary embodiment of the present invention.

FIG. 6 is a flowchart schematically showing a second charging procedure in a charging device of an environmentally-friendly vehicle according to a first exemplary embodiment of the present invention.

Referring to FIG. 5, the environmentally-friendly vehicle according to the present invention stands by (S401), and the charging controller 500 detects whether a plug-in for charging is connected to the outside commercial electric power 600 (S402).

If the charging plug is detected by the commercial electric power 600 in step S402, the charging controller 500 enters into a charging mode (S403) and detects the battery 404 voltage ($V_{batt}$) and the input voltage ($V_{in}$) that is input through the neutral point (N) of the motor 401 that is transformed to a DC voltage through the rectifier 406 (S404).

Next, the charging controller 500 switches the inverter 402 to be operated as a booster through PWM control signal switching (S405).

Accordingly, the inverter 402 boosts the input voltage ($V_{in}$) that is transformed to a DC voltage by the rectifier 406 to be input through the neutral point (N) of the motor 401 to a predetermined voltage, and stores the voltage in the DC link capacitor ($C_{dc}$) of the voltage transformer 403 (S406).

Further, the charging controller 500 compares the input voltage ($V_{in}$) and the battery 404 voltage that are detected in step S404 and determines whether the input voltage ($V_{in}$) exceeds the battery 404 voltage ($V_{batt}$) (S407).

If the input voltage ($V_{in}$) exceeds the battery 404 voltage ($V_{batt}$) in step S407, the charging controller 500 controls the switching of an upper side power switching element $S_1$ and a lower side power switching element $S_2$ forming the voltage transformer 403 to be operated as a buck booster (S408).

Accordingly, the voltage transformer 403 represses the input voltage ($V_{in}$) to a rated charging voltage of the battery 404 (S408) to supply it to the battery 404 as a charging voltage (S410).

If it is determined that the battery 404 voltage ($V_{batt}$) exceeds the input voltage ($V_{in}$) in step S407, the charging controller 500 turns off the switching of the voltage transformer 403 (S409).

In this process, the output current of the voltage transformer 403 is free-wheeled through an inductor of the voltage transformer 403 and a diode of the lower side switch $S_2$.

The voltage that is boosted by the inverter for this period is stored in the DC link capacitor ($C_{dc}$) to be supplied to the battery 404 through a buck booster operation of the voltage transformer 403 if the input voltage ($V_{in}$) exceeds the battery 404 voltage ($Vb_{att}$) (S410).

In this process, while the battery 404 voltage ($V_{batt}$) exceeds the input voltage ($V_{in}$), the voltage transformer 403 does not generate an unnecessary switching operation for boosting or repressing the voltage, and therefore the switching loss does not occur.

The charging controller 500 uses the outside commercial electric power 600 to charge the battery 404 along the above processes, and if it is determined that the battery 404 is completely charged (S414), the relay 405 is turned off to cut off the commercial electric power 600 so as to not overcharge the battery 404, and the charging procedure ends (S412).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

What is claimed is:

1. A charging device comprising;
   a battery adapted and configured to store DC voltage;
   first and second motors adapted and configured to operate as a motor or a generator;
   first and second inverters adapted and configured to operate the first and second motors;
   a voltage transformer adapted and configured to boost the DC voltage of the battery to supply it to the first and second inverters and repress the DC voltage of the inverter to supply it to the battery; and
   a charging controller adapted and configured to operate the first and second inverters as a booster or operate the voltage transformer as a buck booster according to a voltage that is input through a neutral point of the first and second motors and the voltage of the battery,
   wherein the charging controller switches the first and second inverters according to the input voltage of the neutral point such that the first and second inverters are boosters and continuously turns on an upper switching element of the voltage transformer, if the battery voltage exceeds the voltage that is input through the neutral point of the first and second motors.

2. The charging device of claim 1, wherein the charging controller controls the first and second inverters to be turned off and controls the voltage transformer to be a buck booster, if the voltage that is input through the neutral point of the first and second motors exceeds a battery voltage.

3. The charging device of claim 2, wherein the charging controller bypasses the voltage that is input through the neutral point of the first and second motors to the voltage transformer while the first and second inverters are turned off.

4. The charging device of claim 1, wherein the charging controller controls such that the voltage transformer boosts voltage and performs DC voltage transformation to charge the battery, if the input voltage of the neutral point of the first and second motors exceeds a battery voltage.

5. The charging device of claim 1, wherein the charging controller only uses the first and second inverters to perform voltage boosting and DC voltage transformation such that the boosted and DC transformed voltage is supplied to the battery as a charging voltage, if the input voltage that is input through the neutral point of the first and second motors is less than the battery voltage.

6. The charging device of claim 1, wherein the charging controller cuts off the voltage that is input to the neutral point of the first and second motors, if it is determined that the battery is fully charged.

7. The charging device of claim 1, wherein the charging controller operates the first inverter as a booster, if the battery voltage exceeds the input voltage of the neutral point of the first and second motors and the phase of the input voltage has a positive value($V_{in}>0$).

8. The charging device of claim 1, wherein the charging controller operates the second inverter as a booster, if the battery voltage exceeds the input voltage of the neutral point of the first and second motors and the phase of the input voltage has a negative value ($V_{in}<0$).

9. A charging method comprising:
 detecting a connection of a charging plug;
 detecting a voltage that is input through a neutral point of first and second motors and a voltage of a battery, if the connection of the charging plug is detected; and
 charging a battery by operating first and second inverters as boosters or operating a voltage transformer as a buck booster depending on a relation between a voltage input through the neutral point of the first and second motors and a battery voltage,
 wherein the input voltage is repressed only by the voltage transformer to charge the battery, if the voltage input through the neutral point of the first and second motors exceeds the battery voltage, and
 wherein the first and second inverters maintains a turned-off condition and the voltage input through the neutral point of the first and second motors is bypassed to the voltage transformer, if the voltage input through the neutral point of the first and second motors exceeds the battery voltage.

10. The charging method of claim 9, wherein the input voltage is boosted only by the first and second inverters to charge the battery, if the voltage input through the neutral point of the first and second motors is less than the battery voltage.

11. The charging method of claim 10, wherein the first and second inverters are switched depending on the phase of the input voltage such that the first and second inverters are operated as boosters and an upper switching element of the voltage transformer is controlled to be continuously turned on, if the voltage input through the neutral point of the first and second motors is less than the battery voltage.

12. The charging method of claim 11, wherein in a condition that the voltage input through the neutral point of the first and second motors is less than the battery voltage, if the phase of the input voltage is a positive value ($V_{in}>0$), the first inverter is operated as a booster, and if the phase of the input voltage is a negative value ($V_{in}<0$), the second inverter is operated as a booster.

13. A charging method comprising:
 detecting a connection of a charging plug;
 detecting a voltage that is input through a neutral point of first and second motors and a voltage of a battery, if the connection of the charging plug is detected;
 charging a battery by boosting the input voltage through a voltage transformer, if the voltage input through the neutral point of the first and second motors exceeds the battery voltage; and
 charging a battery by boosting the input voltage through first and second inverters depending on the input voltage, if the voltage input through the neutral point of the first and second motors is less than the battery voltage,
 wherein when the first and second inverters boost the input voltage, an upper switching element of the voltage transformer is controlled to be continuously turned on such that a switching loss of the voltage transformer does not occur.

14. The charging method of claim 13, wherein the first and second inverters are maintained in a turned-off condition such that a switching loss does not occur while the input voltage is boosted by the voltage transformer.

15. The charging method of claim 13, wherein when the voltage input through the neutral point of the first and second motors is less than the battery voltage, if the phase of the input voltage is a positive value ($V_{in}>0$), the first inverter is controlled to boost the input voltage, and if the phase of the input voltage is a negative value ($V_{in}<0$), the second inverter is controlled to boost the input voltage.

16. A charging method comprising:
 detecting a connection of a charging plug;
 detecting a voltage that is input through a neutral point of first and second motors and a voltage of a battery, if the connection of the charging plug is detected;
 boosting an input voltage by operating a first inverter or a second inverter as a booster depending on a phase of the voltage input through the neutral point of the first and second motors; and
 charging a battery by operating a voltage transformer as a buck booster or to maintain its switching off condition depending on a relation between the voltage input through the neutral point of the first and second motors and the battery voltage.

17. The charging method of claim 16, wherein if the voltage input through the neutral point of the first and second motors is a positive value ($V_{in}>0$), the first inverter is operated as a booster, and if the phase of the input voltage is a negative value ($V_{in}<0$), the second inverter is operated as a booster.

18. The charging method of claim 16, wherein the voltage transformer is controlled to be a buck booster such that the input voltage that is boosted by the first inverter or the second inverter is repressed to charge the battery, if the voltage input through the neutral point of the first and second motors exceeds the battery voltage.

19. The charging method of claim 16, wherein the voltage transformer is switched off and the voltage that is boosted by the first inverter or the second inverter charges the battery, if the voltage input through the neutral point of the first and second motors is less than the battery voltage.

20. The charging method of claim 19, wherein the voltage transformer bypasses the voltage that is boosted by the first inverter or the second inverter to the battery so as to charge the battery, if the voltage input through the neutral point of the first and second motors is less than the battery voltage.

21. A charging method comprising:
 detecting a voltage that is input through a neutral point of first and second motors and a voltage of a battery, if a connection of a charging plug is detected;
 operating a first inverter as a booster, if a phase of the voltage that is input through the neutral point of the first and second motors is a positive value ($V_{in}>0$), and operating a second inverter as a booster to boost the voltage, if the phase of the voltage is a negative value ($V_{in}<0$);
 operating the voltage transformer as a buck booster such that the input voltage that is boosted by the first inverter or the second inverter is suppressed to charge the battery, if the voltage input through the neutral point of the first and second motors exceeds the battery voltage; and switching off the voltage transformer such that the voltage boosted by the first inverter or the second inverter charges the battery, if the voltage input through the neutral point of the first and second motors is less than the battery voltage.

22. A charging method comprising:

detecting a battery voltage and an input voltage that is transformed to a DC by a rectifier to be input through a neutral point of a motor when a charging plug is connected;

controlling the inverter to be turned off, operating a voltage transformer as a buck booster to suppress the input voltage, and supplying the suppressed voltage to the battery to charge it, if the input voltage exceeds the battery voltage;

boosting the input voltage by operating the inverter as a booster and continuously turning on an upper side power switch element of a voltage transformer to supply a battery with the boosted voltage as a charging voltage, if the input voltage is less than the battery voltage; and if charging is completed, prohibiting transmission of a commercial voltage to the neutral point.

23. A charging method comprising:

detecting a battery voltage and an input voltage that is transformed to a DC voltage by a rectifier to be input through a neutral point of a motor when a charging plug is connected;

boosting the input voltage by operating an inverter as a booster;

operating the voltage transformer as a buck booster to suppress the input voltage that is boosted by the inverter and supplying the suppressed voltage to the battery to charge it, if the input voltage exceeds the battery voltage by comparing the input voltage with the battery voltage;

turning off the voltage transformer to supply the boosted voltage to the battery as a charging voltage, if the input voltage is less than the battery voltage; and if charging is completed, prohibiting transmission of a commercial voltage to the neutral point.

\* \* \* \* \*